United States Patent

Saathoff

[11] Patent Number: 4,531,295
[45] Date of Patent: Jul. 30, 1985

[54] TIMING TOOL

[76] Inventor: Donald G. Saathoff, P.O. Box 632, White Swan, Wash. 98952

[21] Appl. No.: 568,832

[22] Filed: Jan. 6, 1984

[51] Int. Cl.³ ............................ G01B 5/14; G01D 5/02
[52] U.S. Cl. .......................... 33/180 AT; 33/DIG. 15;
  33/169 R; 116/283; 116/281
[58] Field of Search ....... 33/169 B, 180 AT, 181 AT,
  33/DIG. 15, 169 R; 73/116, 119 R; 116/28 R,
  280, 281, 283, 321; 324/391

[56] References Cited

U.S. PATENT DOCUMENTS

| | | | |
|---|---|---|---|
| 1,737,726 | 12/1929 | Muzyn | 33/180 AT |
| 1,782,142 | 11/1930 | Havens | 33/DIG. 15 |
| 2,072,984 | 3/1937 | Haskins | 73/116 |
| 2,149,620 | 3/1939 | Museus | 324/391 |
| 2,511,392 | 6/1950 | Worel | 73/116 |
| 2,602,328 | 7/1952 | Tippett | 73/116 |
| 2,605,636 | 8/1952 | Tippett | 73/116 |
| 4,263,868 | 4/1981 | Fukui | 116/70 |
| 4,294,141 | 10/1981 | Miller | 81/3 R |
| 4,296,629 | 10/1981 | Vuyovich | 73/116 |

FOREIGN PATENT DOCUMENTS 932921 4/1948 France ...................... 33/DIG. 15

Primary Examiner—Charles Frankfort
Assistant Examiner—W. Morris Worth
Attorney, Agent, or Firm—Marvin E. Jacobs

[57] ABSTRACT

The timing tool (10) includes a piston follower (12) slidingly mounted in the base (14) with its lower end (90) in contact with the top (76) of the piston (68) and its upper flat cap end (56) engaging the lock block (16). The lock block (16) slides on rods (18, 20) until top dead center of the piston is located. Thumb screw (30) is then rotated to lock the block in position. The piston (68) is then moved downwardly to form a gap (92) into which a feeler gauge is inserted. The piston is then moved upwardly into position at which the points open and the points are secured into position.

7 Claims, 4 Drawing Figures

U.S. Patent  Jul. 30, 1985  4,531,295
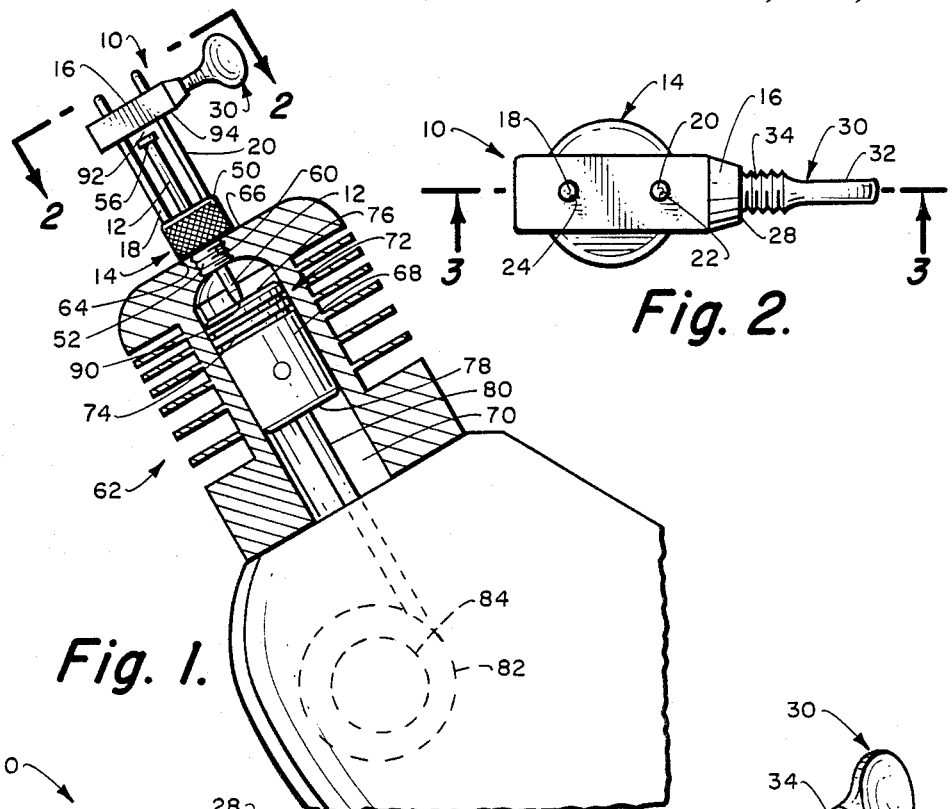
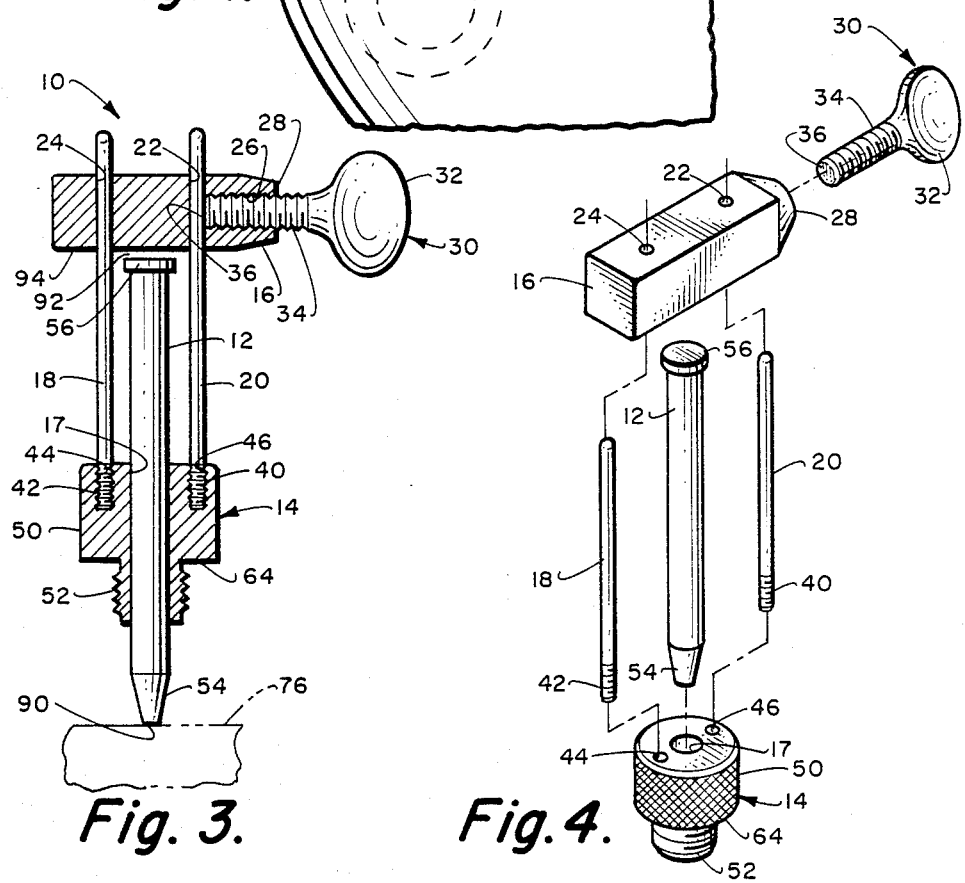

TIMING TOOL

1. Technical Field

This invention relates to a timing tool and, more particularly, to a tool for use in timing a two-cycle internal combustion engine such as a motorcycle engine.

2. Statement of the Prior Art

Internal combustion engines utilize a compression stroke to compress the fuel air mixture before spark ignition. Ignition is timed to occur when the top of the piston head is at an optimum position just below top dead center. If the ignition fires the piston too early or too late, the engine will not run smoothly or efficiently. The firing point is easier to locate in four-cycle engines by using a scope or timing light. However, the firing point can not be located using a scope or timing light in a two-cycle engine. The firing point can only be indirectly determined by marks on the flywheel or various tools or devices which can be used to locate top dead center.

Several devices which screw into the spark plug opening have been designed to aid in timing an internal combustion engine. Museus (U.S. Pat. No. 2,149,632) discloses a device mounted in the spark plug port to check timing of an engine in which compression is used to light a bulb. Worel (U.S. Pat. No. 2,511,392) contacts the piston head with a rod 7 which illuminates a lamp. Tippet's devices (U.S. Pat. Nos. 2,602,328 and 2,605,636) function like an external spark plug. Fukui (U.S. Pat. No. 4,263,868) uses a check valve to hold a piston at top dead center by means of vacuum. Vuyovich (U.S. Pat. No. 4,296,629) also uses a slidable rod in an adaptor to illuminate a lamp to determine top dead center. Miller (U.S. Pat. No. 4,294,141) inflates a balloon to retain overhead valves in position.

However, the optimum position of the piston when ignition occurs is not top dead center. It is an exact position below top dead center. Furthermore, these devices are cumbersome and do not provide a reliable, precise indication of the piston position.

STATEMENT OF THE INVENTION

A timing tool capable of precision timing of a piston engine is provided by the present invention. The tool is reliable and easy to use and can be utilized to determine the exact position of a piston in any internal combustion engine, whether two-cycle or four-cycle. The tool is relatively inexpensive to manufacture since it can be machined and assembled from components available on the market.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is a side view, partly in section, of a cylinder of a two-cycle engine showing the timing tool of the invention inserted into the spark plug opening;

FIG. 2 is a top view in elevation of the timing tool;

FIG. 3 is a view in section taken along line 3—3 of FIG. 2; and

FIG. 4 is a perspective, exploded view of the timing tool of the invention.

DETAILED DESCRIPTION OF THE INVENTION

Referring first to FIGS. 2, 3 and 4, the timing tool 10 comprises a piston follower rod 12 slidingly mounted in a passage 17 in the base 14 and a lock block 16 slidingly mounted on guide rods 18, 20. The upper end portion of the rods is received in smooth bores 22, 24. A threaded passage 26 extends from one side wall 28 into communication with one of the bores 22. The locking thumb screw 30 has its threaded shaft 34 received in the passage 26, and on turning the screw 30 by means of the thumb grip 32, the end 36 moves into locking abutment with the rod 20. This locks the lock block 16 in any desired horizontal position. Many other locking arrangements can be utilized such as use of hard spheres such as ball bearings adjacent the rods which are pressed into engagement with the rods on movement of a set screw.

The lower ends 40, 42 of the guide rods are threaded and are received in threaded bores 44, 46 of the base 14. The outer surface 50 of the base can be roughened or knurled to form a gripping surface. The lower portion of the base 14 contains a threaded extension 52 which forms a means for mounting the tool 10 in a cylinder. Threaded adapters can be placed over the threaded extension 52 to accommodate cylinders having differently sized spark plug openings. The piston follower can be provided with a tapered lower end 54 and a flattened cap 56 at the head of the piston. The cap 56 is wider than the shaft of the rod and prevents the rod 12 from falling through passage 17 in the base 14.

The tool 10 is assembled by inserting the threaded ends 40, 42 of the guide rods 18, 26 into threaded bores 44, 46 in the base. The piston follower 12 is placed in the passage 17 and the lock block is slid onto the rods 18, 20. The threaded end 34 of the thumb screw is inserted into the threaded bore 26 into locking engagement with the rod 20. The tool is now ready for use.

Referring now to FIG. 1, the tool 10 is inserted into the spark plug opening 60 of a piston cylinder 62 by inserting the threaded end 52 of the base in the opening 60 and rotating the base 14 by gripping and rotating the knurled surface 50 until the bottom surface 64 of the base 14 seats on the top surface 66 of the cylinder 62.

The piston 68 reciprocates within the cylindrical cavity 70 and has a top groove 72 receiving a ring 74. The top end 76 faces the spark plug opening 60 while the bottom end 78 is connected to a piston rod 80 which is connected to the flywheel 82 and magneto 84 through linkage, bearings and a motor crank, not shown.

The engine is now tuned according to the following sequence of steps. The magneto cover of a motorcycle is removed to expose the points and the flywheel 82. The thumb screw 30 is now loosened to allow movement of the lock block 16. The magneto 84 and flywheel 82 are rotated in the direction of normal engine motion until top dead center is located. The end 90 of the piston follower 12 is in contact with the top 76 of the piston 68 and will slide and follow movement of the piston. The cap 56 of the piston follower is in engagement by gravity with the lock block 16 which will slide in tandem with the follower 12.

When top dead center is located, the lock block 16 is locked in position on top of the flat cap 56 of the piston follower by rotating the thumb screw 30. The flywheel 82 is then rotated in reverse of motor direction to allow the piston follower 12 to drop below top dead center and to provide a clearance gap 92 between the cap 56 of the follower and the flat bottom surface 94 of the block 16. The mechanic then refers to a reference such as the owner's manual or a shop manual to determine the firing position of the piston with reference to top dead center. A feeler gauge equivalent to this distance is selected and inserted into the gap 92. The flywheel 82 is then rotated in the forward direction locking the feeler gauge against the head 56 and the bottom surface 94 of the block 16. While this position is maintained, the points are cracked to the point at which they just start to open. The points are secured in this position by tightening down on the mounting-adjustment screws. The engine is now tuned and the spark plug and magneto cover can be replaced.

It is to be realized that only preferred embodiments of the invention have been described and that numerous substitutions, modifications and alterations are permissible without departing from the spirit and scope of the invention as defined in the following claims.

I claim:

1. A timing tool comprising in combination
   means for slidingly mounting a piston follower rod having a flat upper end and a lower end in a spark plug opening of a cylinder with the lower end of the rod in contact with the top end of a piston and the upper flat end of the rod extending out of the cylinder;
   said rod mounting means including a base having a threaded lower extension adapted to be received in a threaded spark plug opening and containing a central passage for slidingly receiving said piston follower rod, said rod being freely slidable downwardly into engagement with the top end of the piston and freely slidable upwardly;
   gap means mounted above the flat upper end of the piston follower rod including a block having a flat lower surface parallel to flat upper end of the rod;
   a sliding mount for slidingly mounting the block to move parallel to the upper end of the follower rod, including a plurality of guide rods extending from the base to the block; and
   means associated with the sliding mounting means for locking the block in any selected position for indicating the position of the piston and the gap between the upper end of the piston follower rod and the lower surface of the locked block when the piston is moved away from top dead center.

2. A tool according to claim 1 in which the upper end of the piston follower rod has a flattened cap having a larger diameter than the passage in the base.

3. A tool according to claim 2 in which the base includes an external surface having a roughened, gripping surface.

4. A tool according to claim 1 in which the sliding mount includes two bores in the block, two correspondingly located bores in the base and two guide rods received in said bores said guide rods having upper ends and lower ends.

5. A tool according to claim 4 in which the bores in the base and the lower ends of the guide rods are threaded.

6. A tool according to claim 5 in which the locking means includes a threaded bore in a side of the block in communication with one of the bores in the block and a locking screw threadingly received in the threaded bore.

7. A tool according to claim 6 in which the locking screw is a thumb screw.

* * * * *